United States Patent

Kamerbeek

[11] Patent Number: 5,825,576
[45] Date of Patent: Oct. 20, 1998

[54] INFORMATION STORAGE UNIT WITH MAGNETIC INFORMATION DISC

[75] Inventor: Evert M. H. Kamerbeek, Eindhoven, Netherlands

[73] Assignee: U. S. Philips Corporation, New York, N.Y.

[21] Appl. No.: 728,240

[22] Filed: Oct. 8, 1996

[30] Foreign Application Priority Data

Oct. 10, 1995 [EP] European Pat. Off. ............. 95202718

[51] Int. Cl.$^6$ ................................. G11B 5/86
[52] U.S. Cl. ........................... 360/75; 360/105
[58] Field of Search ............... 360/75, 69, 105, 360/109, 78.12

[56] References Cited

U.S. PATENT DOCUMENTS

| | | | |
|---|---|---|---|
| 5,079,652 | 1/1992 | Ishida et al. | 360/75 |
| 5,241,438 | 8/1993 | Matsushima | 360/105 |
| 5,296,985 | 3/1994 | Mochizuki et al. | 360/75 |
| 5,663,846 | 9/1997 | Masuoka et al. | 360/75 |

FOREIGN PATENT DOCUMENTS

0574074A2  12/1993  European Pat. Off. .

*Primary Examiner*—Nabil Hindi

[57] ABSTRACT

An information storage unit comprises a frame (1), a magnetic information disc (9, 10), particularly a magnetic hard disc, which is rotatable about an axis of rotation (910). A magnetic head (52–55) is arranged on a pivotable support (56–59), and a lifting device lifts the magnetic head from the information disc. The lifting device comprises an electromagnetic actuator (62–65) having a first actuator part which is stationary relative to the frame and a second actuator part arranged on a movable portion (56b–59b) of the support. When the actuator is energized these actuator parts cooperate with one another via an air gap to generate a lifting force. Such an energization is effected particularly when a scanning operation is started and stopped, in order to preclude damaging of the information disc. Energization requires a comparatively small amount of energy and the measure has a favorable effect on the required starting torque.

20 Claims, 4 Drawing Sheets

INFORMATION STORAGE UNIT WITH MAGNETIC INFORMATION DISC

BACKGROUND OF THE INVENTION

This invention relates to an information storage unit comprising a frame, a magnetic information disc which is rotatable about an axis of rotation, a sensor, in particular a magnetic head, disposed on a support on a portion thereof which is movable past an information surface of the information disc, which support is movable relative to the information surface in a direction parallel to the axis of rotation, and a device for moving the sensor away from the information disc, viewed in a direction parallel to said axis of rotation.

Such a unit is known from U.S. Pat. No. 5,241,438. The known unit comprises a magnetic hard disc for the storage of data information and further comprises a magnetic head arranged on a resilient portion of a pivotal arm, for writing and/or reading information. During scanning of a magnetic disc, which is then rotated, the magnetic head floats on an air cushion above the magnetic disc. To preclude damage to the magnetic disc while it is stationary the known unit has a mechanical lifting device for bringing and keeping the magnetic head at a distance from the magnetic disc. This device comprises a stationary supporting element having an inclined supporting surface for cooperation with the resilient portion of the pivotal arm. Upon completion of a scanning operation a pivoting motor moves the resilient portion upwards over the inclined supporting surface into a rest position in which the magnetic head is situated at a distance from the magnetic disc. In the rest condition the pivotal arm is held in position by frictional forces existing between the supporting surface and the resilient portion of the pivotal arm. A drawback of the known unit is that for pivoting the pivotal arm from the rest position to a scanning position comparatively large forces, to be generated by the pivoting motor, are required in order to overcome the frictional forces between the supporting surface and said portion of the pivotal arm. A further drawback is that the supporting surface is subject to wear as a result of the repeated engagement with and sliding movement of the resilient portion of the pivotal arm. Such wear produces dust particles, which may reach the information disc and thereby render this disc unserviceable. Another drawback are the comparatively large dimensions of the supporting element, which is in conflict with a miniaturisation of information storage units.

SUMMARY OF THE INVENTION

It is an object of the invention to provide an information storage unit which does not have said drawbacks.

The information storage unit in accordance with the invention is characterized in that the device comprises an electromagnetic actuator comprising a first actuator part, which is stationary relative to the frame, and a second actuator part, which is carried by the movable portion of the support, which actuator parts, when energized, cooperate with one another via an air gap to subject the movable portion of the support to a force oriented parallel to the axis of rotation of the information disc and directed away from the information disc.

The information storage unit in accordance with the invention is very suitable for use in a magnetic hard disc drive device, for example in the 1.8" and 1.3" devices which are known per se. During scanning the magnetic head in the information storage unit floats in a customary manner at some distance from the information disc, which is rotated about the axis of rotation, an air cushion preventing mechanical contact between the magnetic head and the information disc. When scanning is stopped the magnetic head is preferably kept spaced from the information disc by energization of the electromagnetic actuator in order to preclude mechanical contact between the magnetic head and the information disc which is coming to a halt. When the information disc is set into rotation from standstill, the magnetic head, if it rests on the stationary information disc, is preferably moved away from the information disc and is kept spaced from this disc during energization of the actuator. This precludes damage to the information disc and/or the magnetic head during starting and owing to the absence of friction between the magnetic head and the information disc a comparatively small starting torque is possible, as a result of which the electric power needed for starting is low. Even if the magnetic head cannot be disengaged completely from the information disc the friction between the magnetic head and the information disc during starting can be minimized to such an extent by energization of the actuator that damage to the information disc is precluded and a favourable starting torque is possible. The actuator used in the unit in accordance with the invention can be of small dimensions and energy-effective. If the information disc used in the information storage unit in accordance with the invention has two information surfaces the storage unit preferably comprises two devices of the type described.

An embodiment of the information storage unit in accordance with the invention is characterized in that one of the actuator parts comprises an electrical coil system and the other actuator part comprises a soft-magnetic element. In this storage unit a reliable and effectively operating actuator is obtained with a limited number of parts, the dynamic behaviour of the support being accurately controllable.

An embodiment of the information storage unit in accordance with the invention is characterized in that the electrical coil system comprises a flat coil and the soft-magnetic element is plate-shaped. In this embodiment the electromagnetic actuator can be very flat, which is of great importance in view of miniaturization. The flat coil can be manufactured by means of techniques which are known per se, such as winding or etching.

An embodiment of the information storage unit in accordance with the invention is characterized in that the electrical coil system is disposed on a soft-magnetic body. Such a body improves the magnetic circuit and hence the efficiency of the actuator. The soft-magnetic body may be plate-shaped and may be constructed as a separate plate. Alternatively, the body may be formed as a thin layer on a soft-magnetic substrate by means of deposition techniques which are known per se, or the body may be an integral part of a housing.

An embodiment of the information storage unit in accordance with the invention is characterized in that one of the actuator parts comprises a permanent magnet system for cooperation with a soft-magnetic portion of the other actuator part while the magnetic head is in a hold position at a distance from the information disc. In this embodiment, in which the magnet system may comprise one or more permanent magnets, the magnetic head can, for example, be kept at a distance from an information disc which is in a non-rotating condition, without the actuator being magnetized permanently. Only a brief energization of the actuator is needed to bring the soft-magnetic part within the magnetic range of the magnet system. Another brief energization with a reversed current direction enables the magnetic head to be moved out of the hold position, preferably while the information disc is in a rotating condition. Consequently, no energy is required to keep the magnetic head in its hold position.

An embodiment of the information storage unit in accordance with the invention is characterized in that the electromagnetic actuator is disposed near the magnetic head. This embodiment, which is attractive from the point of view of construction-engineering, requires only small forces to bring and/or keep the magnetic head at a distance from the information disc.

An embodiment of the information storage unit in accordance with the invention, comprising a further information disc, a further support carrying a further sensor, in particular a further magnetic head, and a further device for moving the further sensor away from the further information disc, viewed in a direction parallel to the axis of rotation of the information disc, is characterized in that the further device corresponds to the device as defined previously in the present document. The further magnetic head can be used for scanning a further information surface of a further information disc. Instead of one further device more further device can be used depending on the number of information discs present.

The invention further relates to a magnetic hard disc drive device including the information storage unit in accordance with the invention, the information disc being a magnetic hard disc.

BRIEF DESCRIPTION OF THE DRAWINGS

The invention will now be described in more detail, by way of example, with reference to the accompanying drawings, in which.

Figure 1:
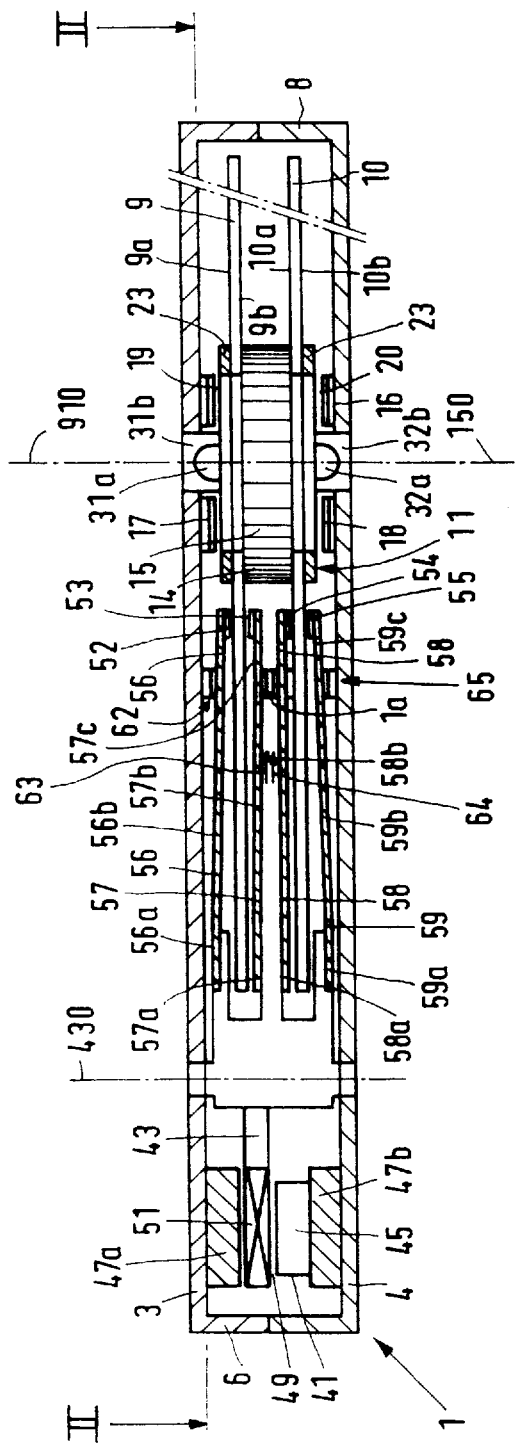
FIG. 1 shows diagrammatically an embodiment of the hard disc drive device in accordance with the invention including an embodiment of the information storage unit in accordance with the invention in a longitudinal sectional view.
Figure 2:
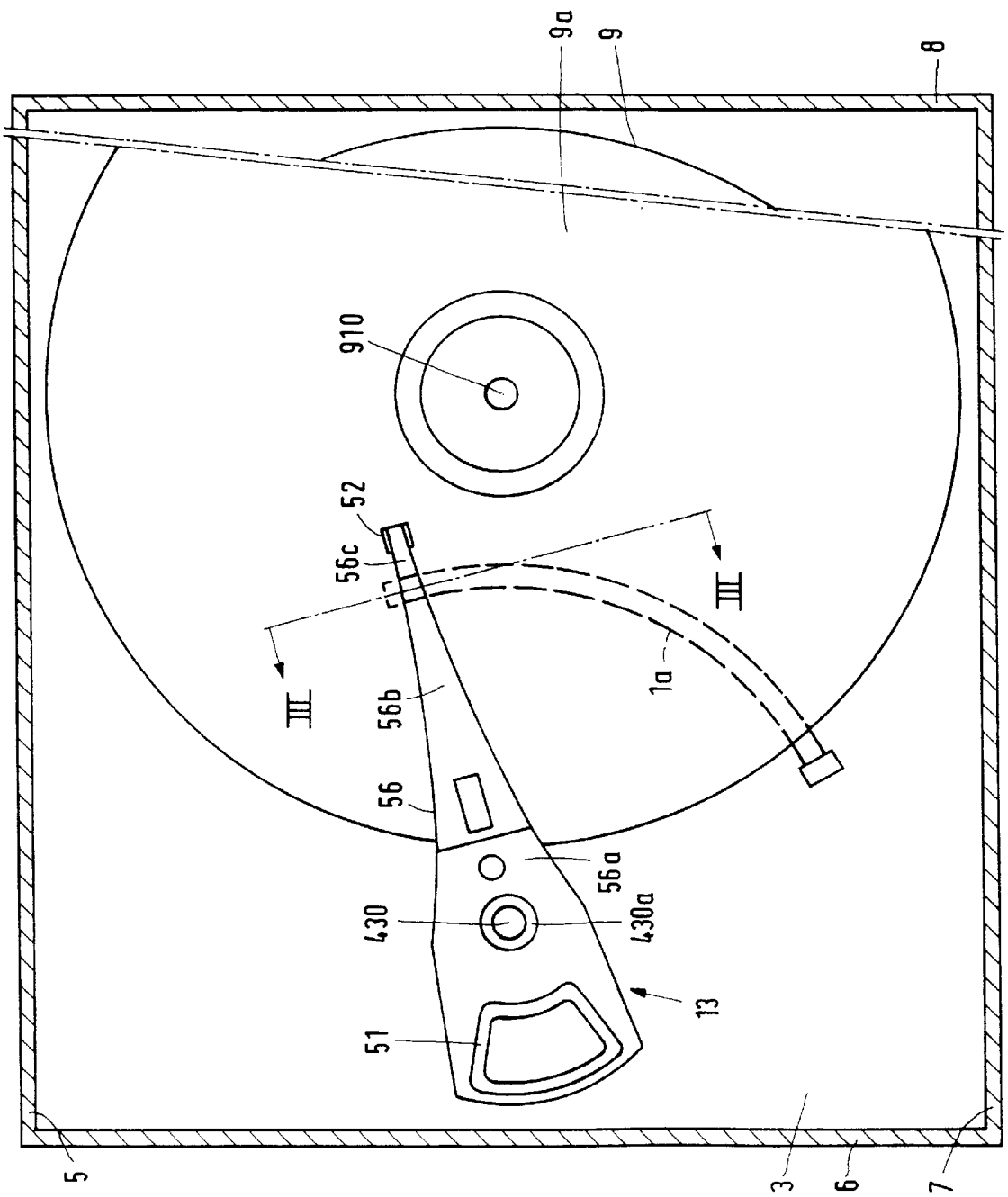
FIG. 2 shows diagrammatically the unit of FIG. 1 in a sectional view II—II.
Figure 3:
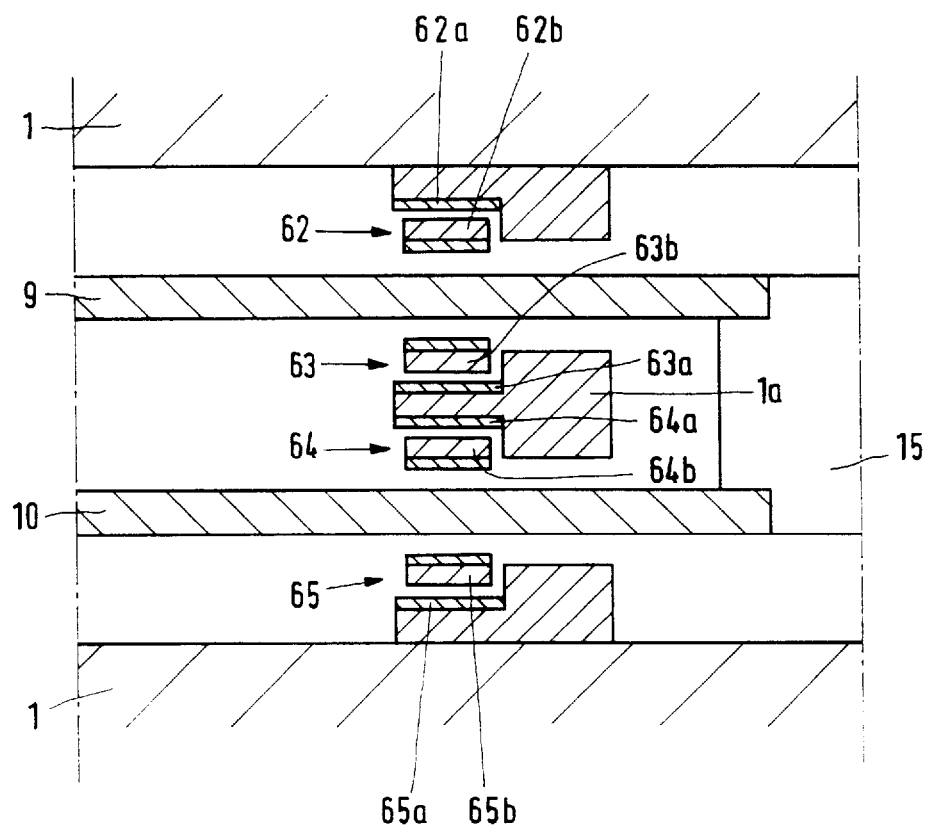
FIG. 3 shows diagrammatically a part of the unit of FIG. 1 in an enlarged-scale sectional view III—III.

The information storage unit in accordance with the invention shown in FIGS. 1, 2 and 3 comprises a frame 1, in the present example a housing, having two parallel main walls 3 and 4 and four side walls 5, 6, 7 and 8 interconnecting the main walls. The housing 1, which may form an at least substantially imperforate cartridge, accommodates two information discS 9 and 10, which are rotatable about an axis of rotation 910, a drive unit 11 for rotating the information discs 9 and 10, and a scanning device 13 for scanning the information discs 9 and 10.

The drive unit 11 is constructed as an axial-field rotary motor comprising a rotor 14 with a permanently magnetized multi-pole rotor magnet 15 and a stator 16 with two coil systems 17 and 18, the rotor magnet preferably being a high-energy magnet, for example of NiFeB. The rotor magnet 15, which is rotatable about a rotor axis 150 which coincides with the axis of rotation 910, is axially magnetized and opposite each of the coil systems 17 and 18 it has magnetic poles, in the present case eight. The coil systems 17 and 18, which in the present example comprise six coils each, cooperate with the rotor magnet 15 via an air gap 19 or 20 and are arranged on the main walls 3 and 4, respectively.

In the present example the information discs 9 and 10 are magnetic hard discs, which are known per se. The magnetic discs each have a base carrying on one information surface or, as in the present example, on both information surfaces 9a, 9b and 10a, 10b, respectively, a magnetic layer in which information such as data has been stored or can be stored. The information discs, which each have a central opening through which the rotor magnet 15 extends, are centred relative to the rotor 14 and are secured to this rotor by means of ring-shaped members 23. Usually, non-recordable annular zones extend between the central opening and the information surfaces.

The information storage unit in accordance with the invention comprises bearing means for supporting the rotor 14 and the information disc 9 secured to this rotor relative to the housing 1. The bearing means comprise two dynamic spiral-groove bearings each having a bearing member 31a and 32a, respectively, shaped as a segment of sphere, and a bearing member 31b and 32b, respectively, shaped as a hollow segment of sphere. The bearing members 31a and 32a, which each have a smooth bearing surface, are secured to the rotor 14, and the bearing members 31b and 32b, which each have a bearing surface formed with a groove pattern, are secured to the main walls 3 and 4, respectively. During rotation of the rotor 14 the groove patterns give rise to a pressure build-up in a medium, such as grease or oil, present between the bearing surfaces of the respective spiral-groove bearings 31 and 32. Instead of the spiral-groove bearings shown it is also possible to use other bearings.

The scanning unit 13 comprises a pivoting motor formed by an electric motor having a stationary motor section 41 and a motor section 43 which is pivotable relative to this stationary section about an axis 430 of a bearing 430a. The stationary motor section 41 comprises an axially magnetized magnet 45 and soft-magnetic yoke members 47a, 47b which are supported by the frame 1. A motor coil 51 of the pivotable motor section 43 is disposed opposite the magnet 45 and in an air gap 49, the motor section 43 being pivotable about the pivotal axis 430 upon energization of the motor coil 51. The scanning unit further comprises four magnetic heads 52–55 and four supports 56–59 for the magnetic heads. The supports 56–59, which are secured to the pivotable motor section 43 of said pivoting motor and thus form pivotal arms, each have a fixed end portion 56a–59a and a portion 56b–59b which is movable relative to this fixed end portion and has a free end portion 56c–59c. During pivoting of the pivotable motor section 43 the supports 56–59 are moved past the surfaces 9a, 9b, 10a and 10b of the information discs 9 and 10. The magnetic heads 52–55 are secured to the free end portions 56c–59c, which owing to resilient properties of the supports 56–59 are movable over a small distance relative to the surfaces 9a, 9b, 10a and 10b in a direction substantially parallel to the axis of rotation 910. The scanning unit 13 further comprises a device for moving the magnetic heads 52–55 away from the information discs 9 and 10, viewed in a direction parallel to the axis of rotation 910 of the information discs. This device comprises four electromagnetic actuators 62–65, each having a stationary first actuator part 62a–65a, situated on the frame 1 or a frame element 1a forming part of the frame 1, and a second actuator part 62b–65b, situated on the movable portion 56b–59b of the support 56–59. The first actuator parts 62a–65a each have a coil system comprising one or more electrical coils, and the second actuator parts 62b–65b, which each extend opposite a first actuator portion 62a–65a and which are preferably situated near the free end portions 56c–59c of the supports 56–59, each comprise a soft-magnetic element. The soft-magnetic element and suitable versions of the coil system are shown in detail in FIGS. 4 to 7.

In the information storage unit in accordance with the invention shown in FIGS. 1 to 3 each of the magnetic heads 52–55 floats at some distance from a facing surface during scanning of an information disc 9 or 10 which rotates about the axis of rotation 910, floating being achieved by means of air cushions produced in that the magnetic heads have been provided with features known per se. When a scanning operation is stopped the magnetic heads are kept spaced from the information discs by energization of the actuators 62–65 in order to preclude mechanical contact between the magnetic heads and the surfaces, particularly the information surfaces of the information discs which are coming to a halt. In a situation in which the information discs 9 and 10 are stationary the magnetic heads need not necessarily be clear of the information discs and the magnetic heads can be made to land on a facing surface in a controlled manner by a controlled reduction of the energization. When the information discs 9 and 10 are set into rotation from a stationary condition the magnetic heads 52–55, if they bear on the information discs, are moved away from these discs by energization of the actuators.

With reference to FIGS. 1 to 3 it is to be noted that, instead of for two information discs, the information storage unit in accordance with the invention may obviously be constructed for one information disc or more than two information discs. Moreover, instead of two information surfaces an information disc may have only one information surface. Thus, in the simplest embodiment the information storage unit in accordance with the invention comprises one magnetic information disc which is rotatable about an axis of rotation and which has only one information surface, a support which is movable past the information surface and which carries one magnetic head, and a device comprising an electromagnetic actuator for subjecting the support to a force oriented parallel to the axis of rotation of the information disc and directed away from the information surface, in order to move and/or keep the magnetic head at a distance from the information surface.

Figure 4:
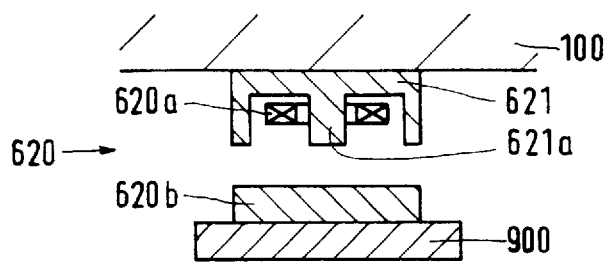
FIG. 4 is a diagrammatic sectional view showing a part of a first variant of an electromagnetic actuator suitable for use in the information storage unit in accordance with the invention.

The embodiment 620 of an electromagnetic actuator shown in FIG. 4 and suitable for use in the information storage unit in accordance with the invention comprises as the first actuator part a ring-shaped round or rectangular coil 620a, which may be arranged on a soft-magnetic yoke-shaped member 621, the coil 620 being disposed around a central portion 621a of the member 621. The actuator 620 comprises as the second actuator member a soft-magnetic plate-shaped element 620b. One of the actuator parts, in the present example the actuator part 620a, can be secured to a frame 100 corresponding to the frame 1 or the frame element 1a (FIGS. 1, 2, 3) and the other actuator part can be secured to a support 900 corresponding to a support 56–59 (FIGS. 1, 2, 3).

Figure 5A:
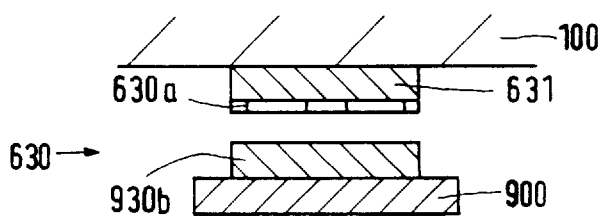
FIG. 5 is a diagrammatic sectional view of a second variant of the electromagnetic actuator.
FIG. 5B is a diagrammatic plan view of the second variant.
Figure 5B:
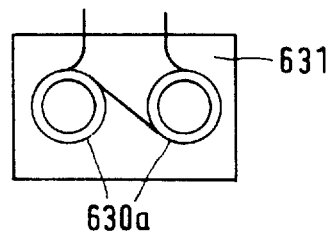

The first actuator part 630a of the actuator 630 shown in FIGS. 5A and 5B comprises a magnetic plate-shaped member 631 carrying flat coils 630a. The second actuator part comprises a soft-magnetic plate-shaped member 630b. As an example, the first actuator part may be secured to the frame 100 and the second actuator part to the support 900.

Figure 6:
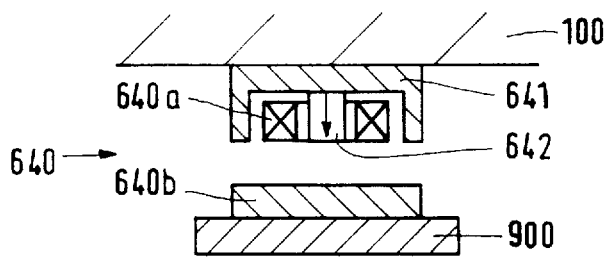
FIG. 6 is a diagrammatic sectional view of a third variant.

The actuator 640 shown in FIG. 6 comprises a first actuator part which, in addition to a coil system 640a, comprises a permanent magnet 642. Both the coil system 640a and the permanent magnet 642 may be arranged on a soft-magnetic body 641. The second actuator part comprises a soft-magnetic element 640b. As an example, the first actuator part may be secured to the frame 100 and the second actuator part to the support 900. The permanent magnet 642 serves to ensure that a magnetic head is also kept clear of an information disc when the coil system is not energized.

Figure 7:
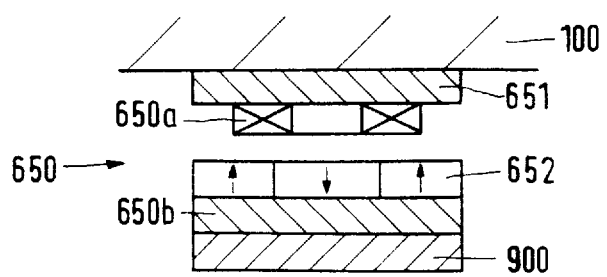
FIG. 7 is a diagrammatic sectional view of a fourth variant.

The embodiment 650 of the actuator shown in FIG. 7 comprises a first actuator part which can be secured to the frame 100 and which carries a coil or coil system 650a, and a second actuator part which can be secured to the support 900 and which comprises a soft-magnetic element 650b. The coil system 650a is disposed on a soft-magnetic body 641. The soft-magnetic element 650b carries a permanent magnet system 652.

It is to be noted that the invention is not limited to the embodiments shown herein. For example, within the scope of the invention it is conceivable that the information storage unit comprises one or more information discs each having one or two information surfaces.

I claim:

1. An information storage unit comprising a frame, a magnetic information disc which is rotatable about an axis of rotation, a magnetic head disposed on a support on a portion thereof which is movable past an information surface of the information disc, which support is movable relative to the information surface in a direction parallel to the axis of rotation, and a device for moving the magnetic head away from the information disc, viewed in a direction parallel to said axis of rotation, characterized in that the device comprises an electromagnetic actuator comprising a first actuator part, which is stationary relative to the frame, and a second actuator part, which is carried by the movable portion of the support, which actuator parts, when energized, cooperate with one another via an air gap to subject the movable portion of the support to a force oriented parallel to the axis of rotation of the information disc and directed away from the information disc.

2. An information storage unit as claimed in claim 1, characterized in that one of the actuator parts comprises an electrical coil system and the other actuator part comprises a soft-magnetic element.

3. An information storage unit as claimed in claim 2, characterized in that the electrical coil system comprises a flat coil and the soft-magnetic element is plate-shaped.

4. An information storage unit as claimed in claim 2, characterized in that the electrical coil system is disposed on a soft-magnetic body.

5. An information storage unit as claimed in claim 1, characterized in that one of the actuator parts comprises a permanent magnet system for cooperation with a soft-magnetic portion of the other actuator part while the magnetic head is in a hold position at a distance from the information disc.

6. An information storage unit as claimed in claim 1, characterized in that the electromagnetic actuator is disposed near the magnetic head.

7. An information storage unit as claimed in claim 1, comprising a further information disc, a further support carrying a further sensor, and a further device for moving the further sensor away from the further information disc, viewed in a direction parallel to the axis of rotation of the information disc.

8. A magnetic hard-disc drive including the information storage unit as claimed in claim 1, the information disc being a magnetic hard disc.

9. An information storage unit as claimed in claim 3, characterized in that the electrical coil system is disposed on a soft-magnetic body.

10. An information storage unit as claimed in claim 2, characterized in that one of the actuator parts comprises a permanent magnet system for cooperation with a soft-magnetic portion of the other actuator part while the magnetic head is in a hold position at a distance from the information disc.

11. An information storage unit as claimed in claim 3, characterized in that one of the actuator parts comprises a permanent magnet system for cooperation with a soft-magnetic portion of the other actuator part while the magnetic head is in a hold position at a distance from the information disc.

12. An information storage unit as claimed in claim 4, characterized in that one of the actuator parts comprises a permanent magnet system for cooperation with a soft-magnetic portion of the other actuator part while the magnetic head is in a hold position at a distance from the information disc.

13. An information storage unit as claimed in claim 2, comprising a further information disc, a further support carrying a further sensor, and a further device for moving the further sensor away from the further information disc, viewed in a direction parallel to the axis of rotation of the information disc.

14. An information storage unit as claimed in claim 3, comprising a further information disc, a further support carrying a further sensor, and a further device for moving the further sensor away from the further information disc, viewed in a direction parallel to the axis of rotation of the information disc.

15. An information storage unit as claimed in claim 4, comprising a further information disc, a further support carrying a further sensor, and a further device for moving the further sensor away from the further information disc, viewed in a direction parallel to the axis of rotation of the information disc.

16. An information storage unit as claimed in claim 5, comprising a further information disc, a further support carrying a further sensor, and a further device for moving the further sensor away from the further information disc, viewed in a direction parallel to the axis of rotation of the information disc.

17. A magnetic hard-disc drive including the information storage unit as claimed in claim 2, the information disc being a magnetic hard disc.

18. A magnetic hard-disc drive including the information storage unit as claimed in claim 4, the information disc being a magnetic hard disc.

19. A magnetic hard-disc drive including the information storage unit as claimed in claim 5, the information disc being a magnetic hard disc.

20. A magnetic hard-disc drive including the information storage unit as claimed in claim 7, the information disc being a magnetic hard disc.

* * * * *